(12) United States Patent
Damen et al.

(10) Patent No.: US 6,356,370 B1
(45) Date of Patent: Mar. 12, 2002

(54) WAVELENGTH ADD-DROP MULTIPLEXING USING FOUR-WAVE-MIXING

(75) Inventors: Theodoor Charlouis Damen, Colts Neck; Jagdeep Shah, Holmdel Township, Monmouth County, both of NJ (US); Masahiro Tsuchiya, Tokyo (JP)

(73) Assignee: Agere Systems Optoelectronics Guardian Corp., Orlando, FL (US)

( * ) Notice: Subject to any disclaimer, the term of this patent is extended or adjusted under 35 U.S.C. 154(b) by 0 days.

(21) Appl. No.: 09/066,132

(22) Filed: Apr. 24, 1998

(Under 37 CFR 1.47)

Related U.S. Application Data

(60) Provisional application No. 60/048,825, filed on Jun. 6, 1997.

(51) Int. Cl.$^7$ .................................. H09J 14/02
(52) U.S. Cl. ..................... 359/134; 359/326; 359/127; 372/92
(58) Field of Search ................... 359/127, 134, 359/326, 160, 161; 372/92

(56) References Cited

U.S. PATENT DOCUMENTS 5,604,618 A * 2/1997 Mori et al. ................. 359/127

OTHER PUBLICATIONS

Tsuchiya et al., "Efficient generation(1.6%) of highly non-degenerate four-wave mixing signal in a semiconductor microcavity using oblique incidence configuration", CLEO'98, May 7, 1998.*

* cited by examiner

Primary Examiner—Kinfe-Michael Negash

(57) ABSTRACT

A new method and apparatus provide efficient highly non-degenerate four-wave mixing (FWM) signal in a semiconductor quantum well microcavity device. The phase mismatch between beam incidence angle and microcavity resonance frequency is minimized by using obliquely incident pump and probe beams. The FWM device is used to implement a wavelength multiplexer, a demultiplexer, a packet wavelength multiplexer, a packet demultiplexer, a time division multiplexer, a time division demultiplexer, a wavelength converter, and a wavelength switch.

19 Claims, 8 Drawing Sheets

WAVELENGTH ADD-DROP MULTIPLEXING USING FOUR-WAVE-MIXING

RELATED APPLICATIONS

This application is based on a provisional application, Ser. No. 60/048,825 filed on Jun. 6, 1997 and entitled "EFFICIENT WAVELENGTH ADD-DROP MULTIPLEXING (WADM) USING FOUR-WAVE-MIXING IN MICROCAVITIES."

TECHNICAL FIELD OF THE INVENTION

This invention relates to wavelength add-drop multiplexing schemes and, more particularly, to the use of four-wave-mixing to implement such schemes.

BACKGROUND OF THE INVENTION

The nonlinear optical response of semiconductor microcavities has attracted considerable attention recently. For instance, the time resolved measurement technique utilizing four-wave mixing (FWM) has provided the clear observation and systematic study of the normal mode oscillations in the THz regime [1]. (Note that in the above and following description, a reference's identification [e.g., 1] refers to that reference's location in the Appendix) In addition, the high finesse of microcavities allows enhancement of optical intensity inside cavities [2], which leads to higher nonlinear sensitivity and subsequent interesting phenomena: enhanced light diffraction, enhanced bleaching of absorption, THz oscillation of emission, etc. [3–5].

Non-degenerate four-wave mixing (ND-FWM) in semiconductor materials is an important optical parametric process that has also attracted increased current interest for applications. It provides the functionality of wavelength conversion required in the future fiber optic telecommunication technologies: for example, the all-optical wavelength conversion in the wavelength division multiplexing systems [6] and the mid-span spectral inversion in the long haul optical fiber cables [7]. Representative devices to realize such highly non-degenerate FWM signal generation in an efficient manner are optical waveguide devices, especially traveling wave semiconductor laser amplifiers [8–12, 18].

From such a viewpoint, it is interesting to study the ND-FWM phenomena in a microcavity and to investigate its potential as a wavelength conversion device. The advantages offered by the vertical cavity configuration, for instance, no cleaved facets, no anti-reflection coating and lower insertion loss, are attractive if the ND-FWM signal generation scheme works efficiently. Indeed, a degenerate FWM experiment with a GaAs microcavity has been reported and diffraction efficiency hd of 0.5% was demonstrated for 150 pJ pump pulses [3]. A ND-FWM experiment with a vertical cavity surface emitting laser was also performed [13]. The frequency shift in the latter was limited to 10 GHz, because only the resonance mode in the direction of surface normal was utilized. In those two cases, the degree of non-degeneracy was limited by the cavity resonance widths and, therefore, the non-degeneracy and enhancement of optical field are in a trade-off relationship.

Before such ND-FWM devices can be of practical use in optical communication systems they have to exhibit enhanced frequency shift and improved efficiency.

SUMMARY OF THE INVENTION

In accordance with the present invention, a new non-degenerate four-wave mixing (ND-FWM) method and apparatus are disclosed in which both pump and probe beams are incident at predetermined oblique angles and results in efficient highly ND-FWM signal generated from a microcavity device that includes a semiconductor quantum well. The phase mismatch originating from the unique relationship between a beam incidence angle and its microcavity resonance frequency is minimized when both of pump and probe beams are obliquely incident.

According to one feature of the invention, the relationship between the wavelengths of the pump $\omega_P$ and probe signals $\omega_{PR}$ and the $\theta_P^{(i)}$ and $\theta_{PR}^{(i)}$ oblique angles, respectively, is given by $$\omega_{res} = \frac{\omega_0}{\cos \theta^{(t)}} = \omega_0 \sqrt{1 + \left|\frac{k_\parallel}{k_\perp}\right|^2}$$

where $\omega_0$ is the resonance frequency for the normal incidence, $k_\perp$ and $k_\parallel$ are internal wave vector components normal and parallel to the microcavity surface, respectively, and $\theta^t$ is the internal incident angle corresponding to these wavevectors.

In other embodiments, the disclosed FWM techniques are used to implement a wavelength multiplexer and a demultiplexer. In yet other embodiments, the FWM techniques are used with a switched or pulsed pump signal to implement a packet wavelength multiplexer and a packet demultiplexer.

DETAILED DESCRIPTION

In the following description, each item or block of each figure has a reference designation associated therewith, the first number of which refers to the figure in which that item is first located (e.g., 401 is located in FIG. 4). In the following description it should be noted that $\omega$ refers to the frequency of the lightwave and wherever we refer to the wavelength of $\omega$, it means the wavelength corresponding to that frequency $\omega$.

Figure 1A:
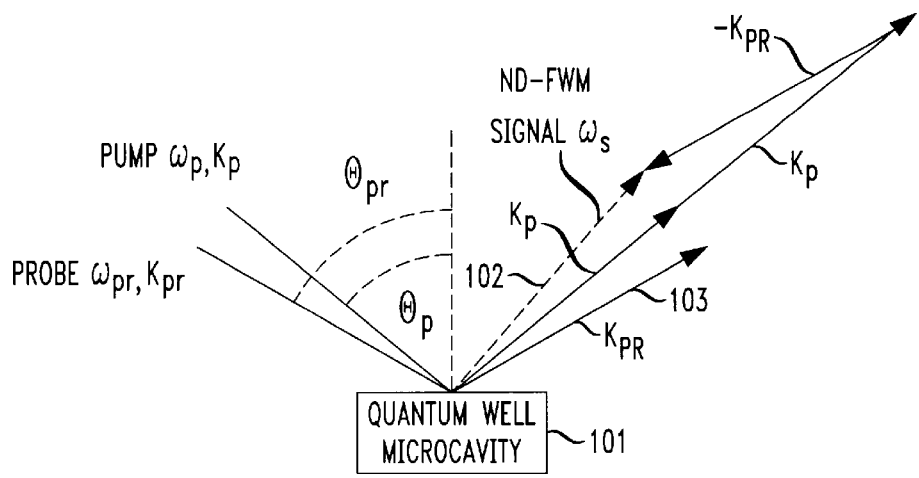
FIG. 1(a) shows a schematic drawing of geometrical arrangement of pump $\omega_p$ and probe $\omega_{pr}$ beams and generation of non-degenerate four-wave mixing signal $\omega_s$.
Figure 1B:
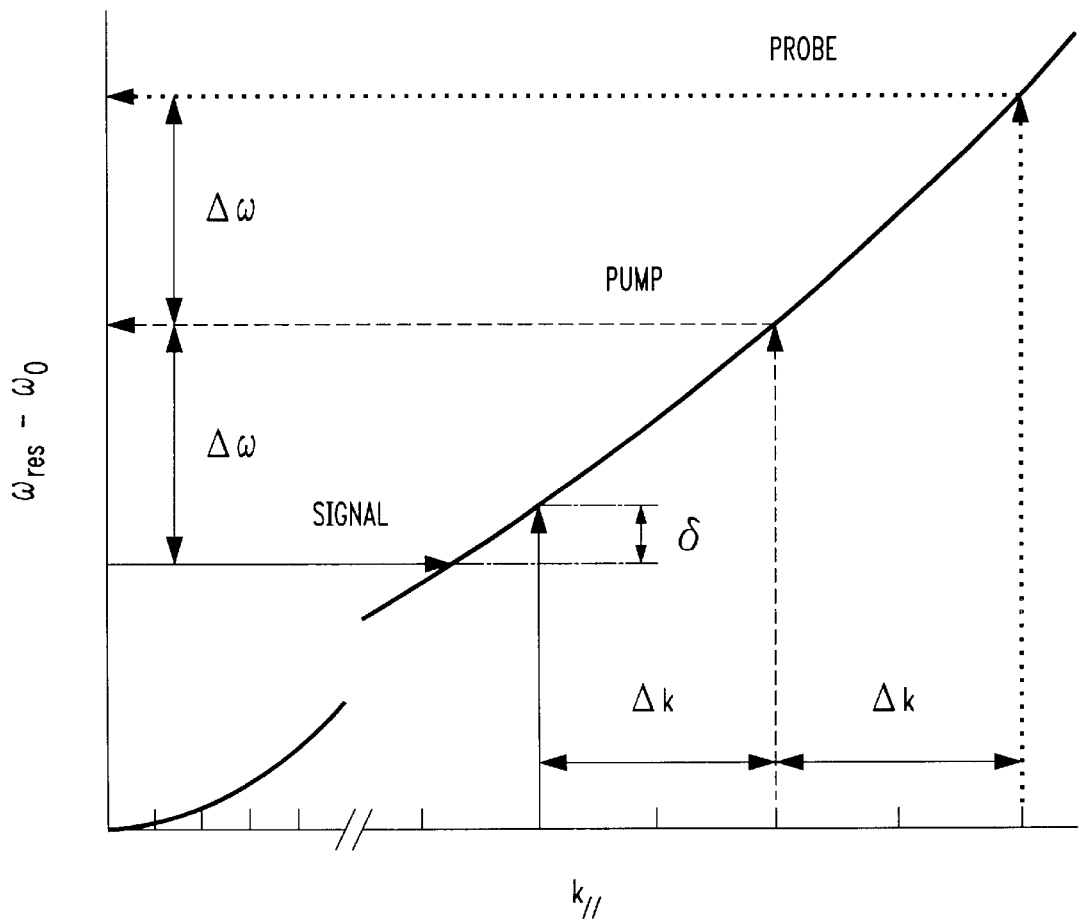
FIG. 1(b) shows the dependence of cavity resonance frequency $\omega_{res}$ on wave vector component $k_\parallel$ in the cavity plane and the relationship among the pump $\omega_p$, probe $\omega_{pr}$, and signal $\omega_s$ beams with respect to frequency and wave vector is indicated by lines and arrows. Where $\Delta\omega$ is frequency shift, $\Delta K$ is difference in wave vector, and $\delta$ is frequency mismatch.

With reference to FIG. 1($a$), and in accordance with the present invention, we describe a new method and apparatus in which both pump $\omega_p$ and probe $\omega_{pr}$ beams are incident at appropriate angles $\theta_p$ and $\theta_{pr}$, respectively, and result in efficient highly non-degenerate four-wave mixing (ND-FWM) signal $\omega_s$ generated in a semiconductor quantum well microcavity device 101. Note, the angle of incidence $\theta_{pr}$ for the probe beam wpr would essentially equal to the angle of reflection of the reflected probe beam $\omega_{pr'}$, shown as 103. While the wavelength of the pump beam $\omega_p$ is shown in FIG. 1 to be at a higher wavelength than the probe beam $\omega_{pr}$, it should be noted that FWM can also occur in the microcavity device when the wavelength of the probe beam $\omega_{pr}$ is greater than the wavelength of the pump beam $\omega_p$. Additionally, while the microcavity device of FIG. 1($a$) is shown to operate in a reflective mode, as will be discussed with reference to FIGS. 5–7, these devices can also be operated in a transmission mode with appropriate materials or processing.

The phase mismatch originating from the unique relationship between a beam incidence angle and its cavity resonance frequency is minimized by using a new method where both of pump $\omega_p$ and probe $\omega_{pr}$ beams are obliquely incident. External efficiency of 1.6% was measured at 10 K for 1.5 THz frequency conversion of probe pulses by using 1 ps pump pulses of 55 pJ incident pulse energy.

As is well known, the relationship between an internal beam incidence angle $\theta^{(I)}$ and its cavity resonance frequency $\omega_{res}$ is given by $$\omega_{res} = \frac{\omega_0}{\cos \theta^{(I)}} = \omega_0 \sqrt{1 + \left|\frac{k_\parallel}{k_\perp}\right|^2} \quad (1)$$

which is plotted in FIG. 1($b$), where $\omega_0$ is the resonance frequency for the normal incidence, $k_\perp$ and $k_\parallel$ are internal wave vector components normal and parallel to the surface, respectively. Let pump and probe beams have different external incidence angles $\theta_p^{(e)}$ and $\theta_{pr}^{(e)}$, respectively. Only the components with optical frequencies $\omega_p$ and $\omega_{pr}$ according to Eq. 1 are allowed to penetrate into the cavity. If the energy and wave vector conservation rules are taken into account, a FWM signal with a frequency of $2\omega_p - \omega_{pr}$ should be generated with a wave vector of $2k_p - k_{pr} = k_\parallel + (2k_{\perp p} - k_{\perp pr})$ [14]. Here, $k_{\perp p}$ and $k_{\perp pr}$ are surface parallel component of internal wave vector for the pump and probe, respectively. Because of the nonlinearity in Eq. 1, those two do not match on the dispersion curve as shown in FIG. 1($b$). Here we define the amount of energy frequency mismatch as $\delta$. One should note here, however, that as $k_\perp$ gets larger the relationship of Eq. 1 becomes closer to a linear one and eventually $\delta$ decreases. If it is smaller than the finite energy width (full width at half maximum) of cavity resonance $\Delta$, enhanced FWM signal emission can be expected. Although a larger $\theta^{(I)}$ gives a smaller $\delta$, upper limit of $\theta^{(I)}$ is given by the degradation of distributed Bragg reflector (DBR) reflectivity at large angles [15]. In one illustrative example, we setup $\theta_p^{(e)}$ and $\theta_{pr}^{(e)}$ to be 20.3 degrees and 24 degrees, respectively, which gives rise to a calculated frequency detuning $\Delta\omega = \omega_{pr} - \omega_p$ of 2.9 meV. In such a case, $\delta$ is expected to be 0.7 meV which is less than $\Delta$ of our sample (~1 meV).

Figure 4:
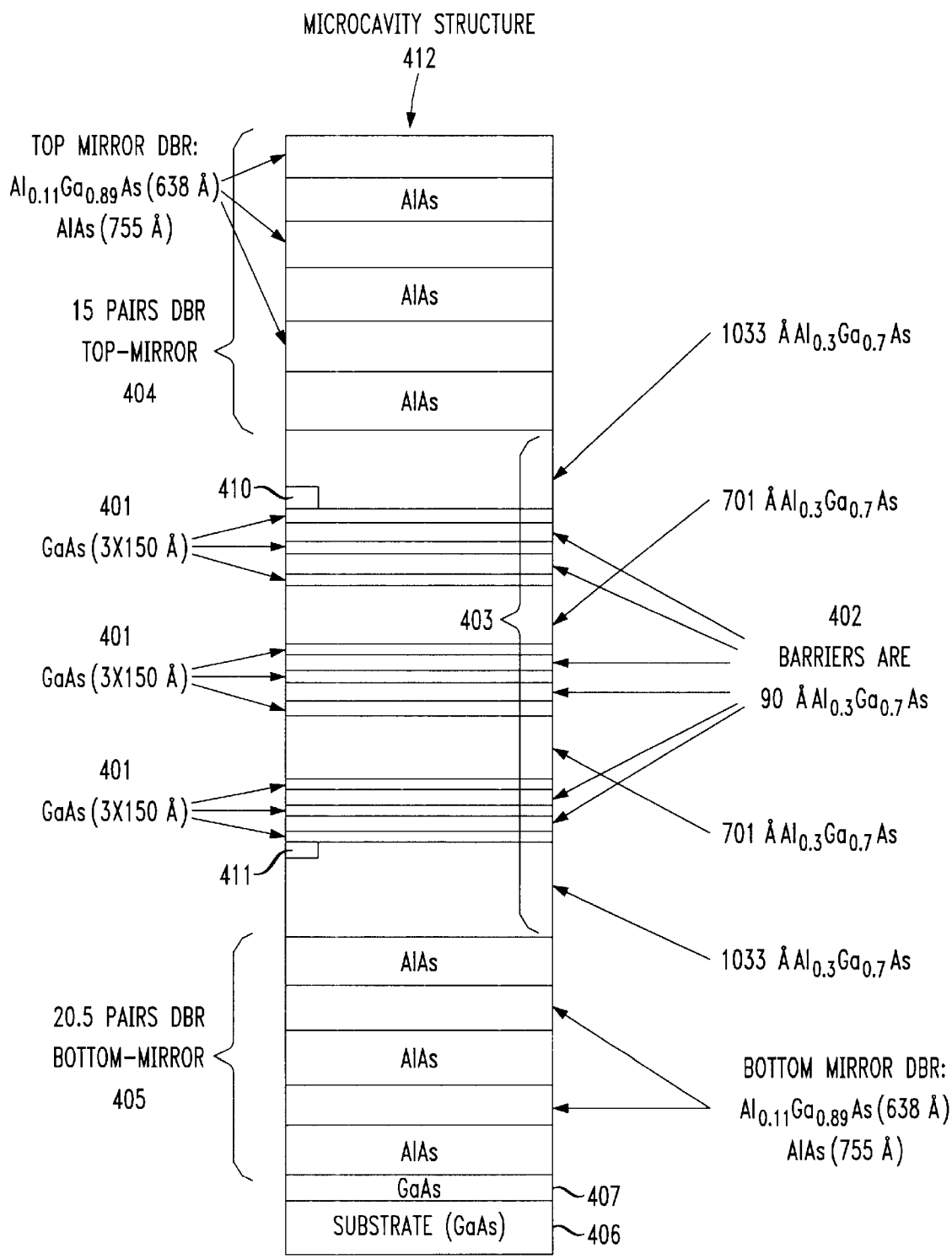
FIG. 4 shows an illustrative active microcavity structure in accordance with the present invention.

The illustrative structure of a reflective microcavity device [1] of FIG. 1 is shown in FIG. 4. The dimensions of the various layers are illustrative and vary with the wavelengths at which the microcavity device is to operate. In this example, the microcavity is a semiconductor microcavity that consists of two epitaxially-grown distributed Bragg reflectors (DBR) 404 and 405 separated by spacer layers 403 which are a multiple of $\lambda/2$ where $\lambda$ is the cavity (Fabry-Perot) resonance wavelength for normal incidence. An active region such as one or more quantum wells (e.g., three are shown, 401 in FIG. 4) is placed at or near the anti-node of the cavity spacer layer where the electric field is maximum. As is well-known, the enhanced electric field at the anti-node enhances the efficiency of nonlinear processes in the microcavity compared to an identical active layer without the microcavity. However, for normal incidence, efficient FWM can only be generated for wavelengths within the cavity resonance linewidth that is determined by the DBR reflectivities and losses in the microcavity. This limits the generation of frequency sidebands to≈GHz. Wavelength conversion using FWM in Semiconductor Optical Amplifiers (SOA) in the waveguide geometry has been demonstrated for large wavelength shifts, but the signal is superimposed on a large background due to amplified spontaneous emission which gives significant noise. Also large frequency shifts in semiconductor amplifiers utilize non-resonant nonlinear processes which are less efficient. However, the technique utilized by our invention is background-free and hence has less noise.

Figure 5:
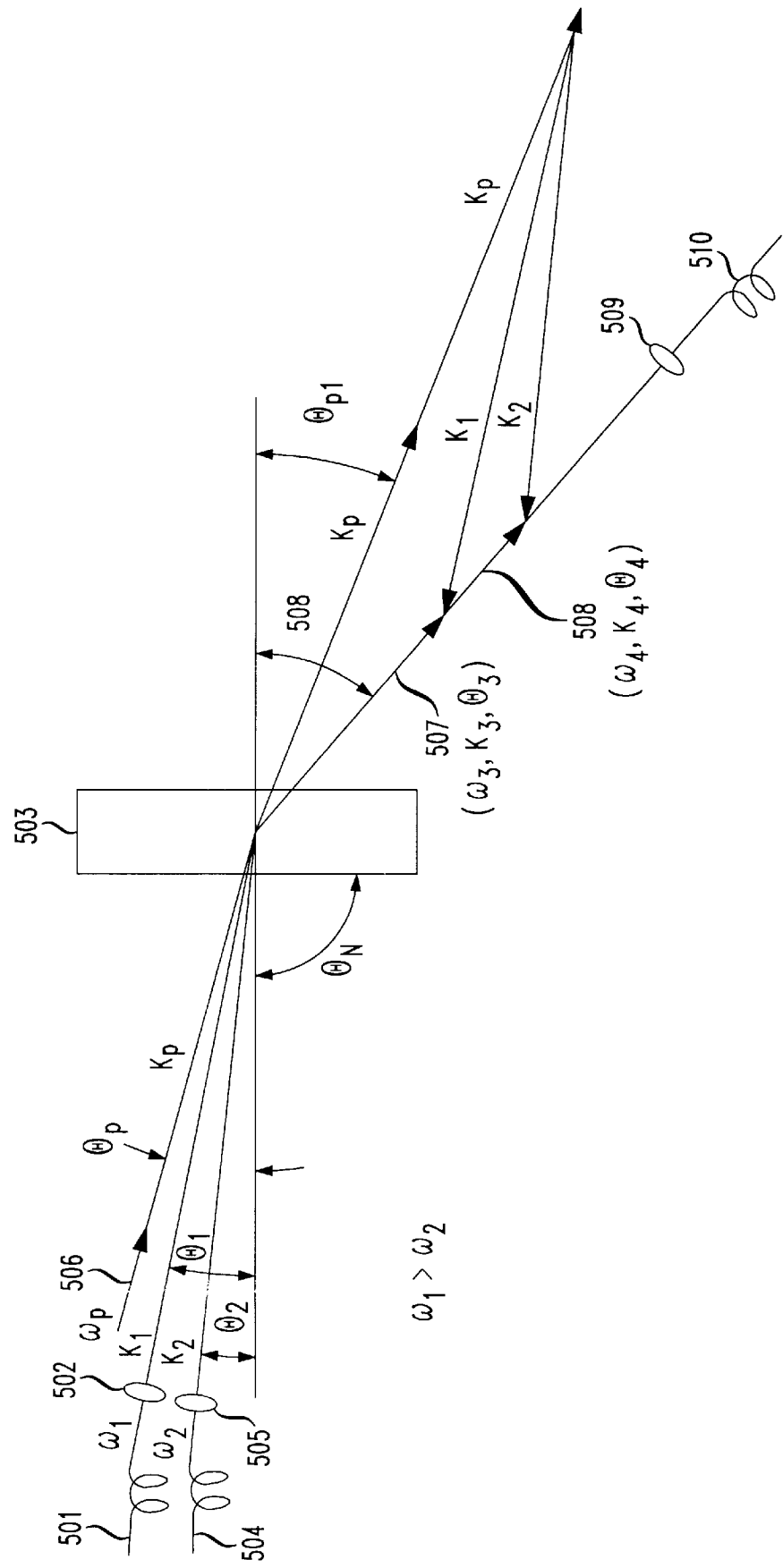
FIG. 5 shows an illustrative wavelength division multiplexer using an active microcavity in a transmission mode in accordance with the present invention.
Figure 6:
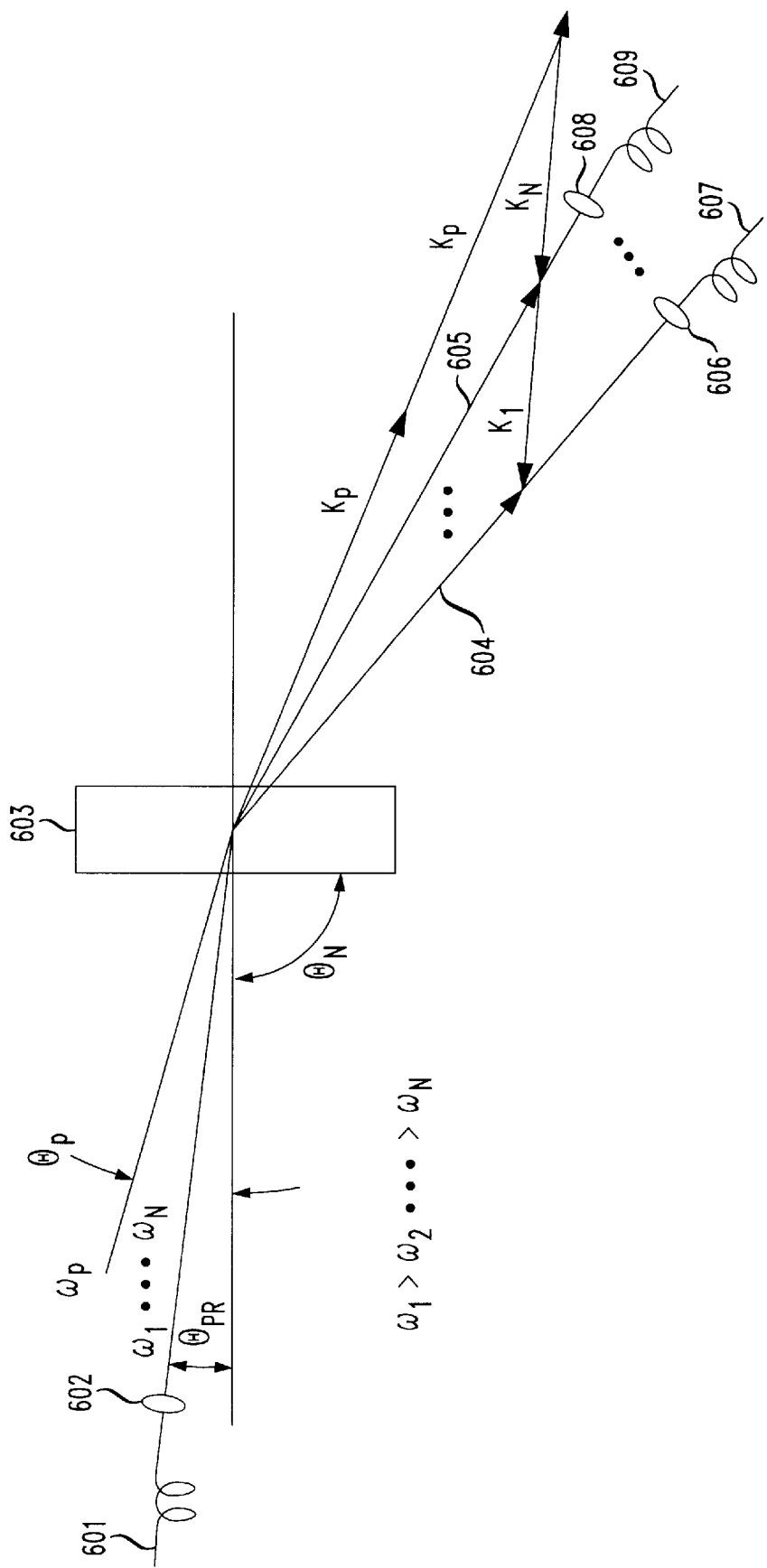
FIG. 6 shows an illustrative wavelength division demultiplexer using an active microcavity in a transmission mode in accordance with the present invention.
Figure 7:
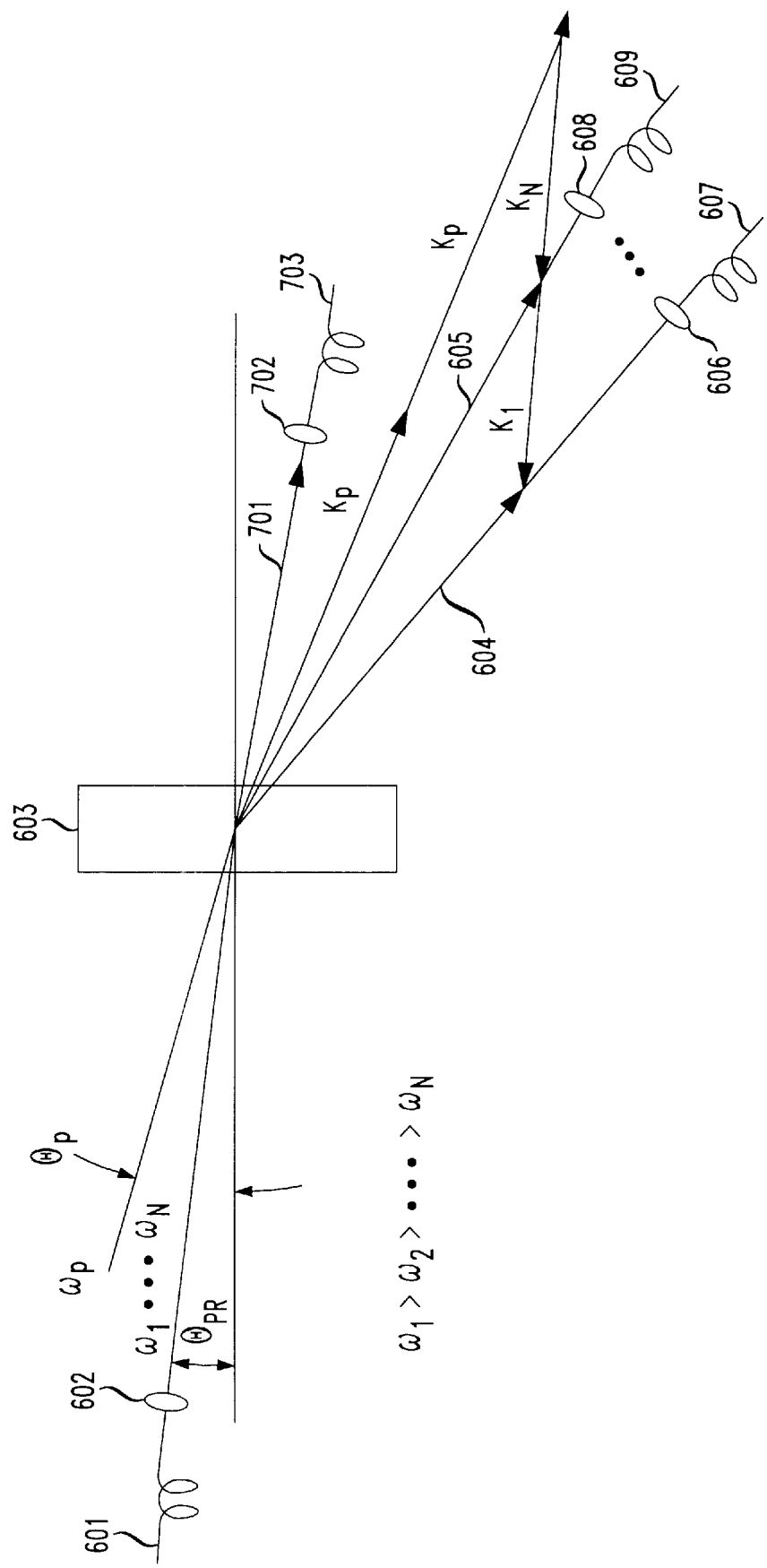
FIG. 7 shows an illustrative time-division multiplexed (TDM) wavelength division multiplexer using an active microcavity in a transmission mode in accordance with the present invention.

The three GaAs quantum wells, 401, are illustratively, of 15 nm thickness, separated by 9 nm $Al_{0.3}Ga_{0.7}As$ barriers, 402, and placed at an anti-node position of a $3\mu/2$ spacer layer 403 The microcavity is sandwiched by 15 and 20.5 pairs of $Al_{0.11}Ga_{0.89}As/AlAs$ quarter wave stacks which form the Bragg reflectors (DBR) mirrors, 404 and 405, at top, and bottom, respectively. Note, that the higher the reflectivity of the Bragg reflectors 404 and 405 the higher the finesse (or optical Q) or electric field of the microcavity, thereby increasing the effective efficiency of the microcavity. The bandpass of the Bragg reflectors 404 and 405 is selected so as to encompass the wavelengths of the desired pump and probe signals. Optical gain may be introduced in the microcavity, either by either electrical pumping (by applying a bias current across the contacts 410 and 411) or by optical pumping (by using a pump laser signal 412). Optical amplification will result in additional nonlinearities and should enhance efficiency. Such optical amplification in the microcavity may also eliminate the need to amplify the diffracted signal externally. The substrate 406 enables the microcavity device 101 of FIG. 1($a$) to operate in a reflective mode. The GaAs layer 407 is deposited by Molecular Beam Epitaxy (MBE) to smooth the surface of substrate 406 to improve the quality of the other layers. The substrate 406 and layer 407 are removed or a transparent substrate 406 and layer 407 (transparent to the pump and probe wavelengths) are used when the microcavity device is to be operated in a transmission mode (as shown in FIGS. 5–7).

For the testing of our illustrative example of FIG. 1(*a*), the microcavity device 101 was cooled down to 10 K. Under a cold cavity condition, $\Delta$ of 1 meV was observed. Since the effective cavity length is calculated to be 1 $\mu$m [16], the cavity finesse is ~200 which nearly corresponds to expected enhancement of optical intensity inside the cavity [2]. Such an enhancement of optical field is expected to lead to higher efficiency of FWM signal generation [3].

Figure 2A:
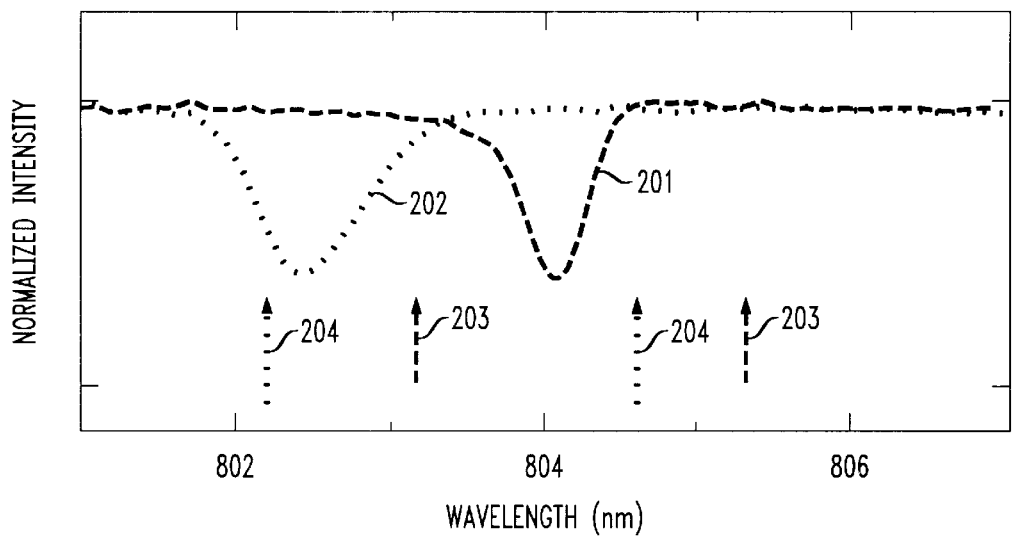
FIG. 2(a) shows the reflectance spectra measured with 100 fs mode-locked Ti: Sapphire laser pulses for the pump (dashed line) and probe (dotted line) beams at the appropriate incident angles. Those spectra were measured for high intensity input where the normal mode splitting collapses. Dashed and dotted arrows show positions of normal mode dips in reflectivity of pump and probe, respectively, for the cases of low intensity input.
Figure 2B:
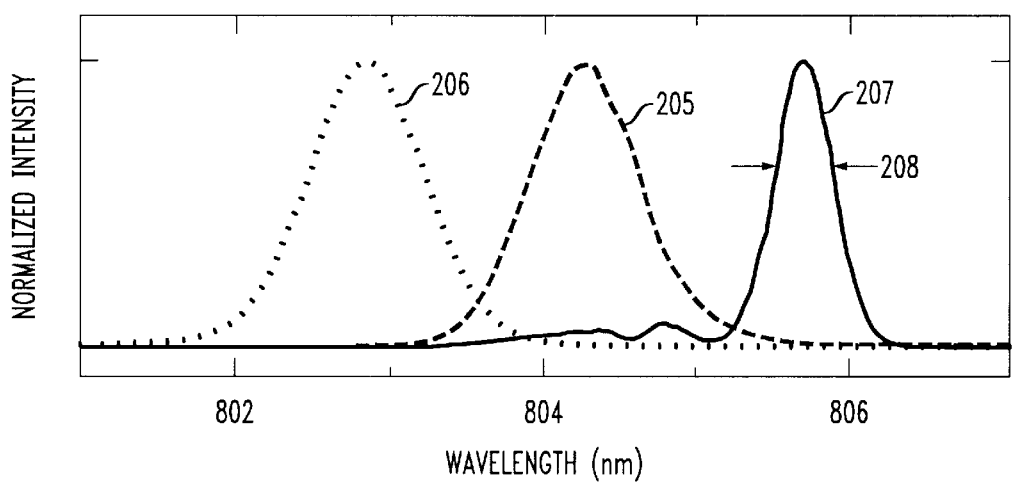
FIG. 2(b) shows the spectra of pump and probe beams (dashed and dotted curves, respectively) which were spectrum-sliced out of 100 fs mode-locked Ti: sapphire laser pulses by using prisms and slits. The spectrum of observed non-degenerate four-wave mixing signal in the direction of $2k_p - k_{pr}$ is also shown as the solid curve.
Figure 2C:
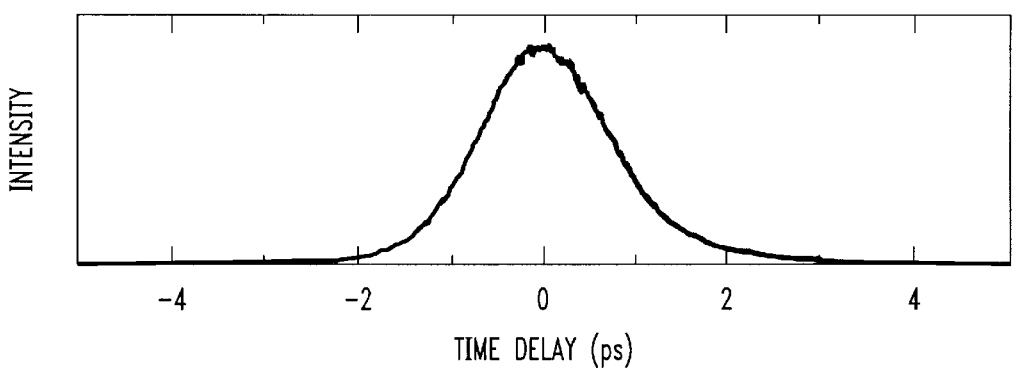
FIG. 2(c) shows a non-degenerate four-wave (ND-FWM) signal intensity plotted as a function of probe delay time.

FIG. 2(*a*) shows the reflectance spectra measured for the two incidence angles (20.3 degrees for the pump (dashed curve 201) and 24 degrees for the probe (dotted curve 202)) with high intensity 100 fs mode-locked Ti: sapphire laser pulses: single dips indicate the cavity resonance for pump and probe and the energy difference is 3.1 meV, which is in fairly good agreement with the expected value in the above. For the low intensity limits, the normal mode splitting was observed [17], whose wavelengths are shown by arrows in FIG. 2(*a*) (dashed arrows, 203, for the pump and dotted arrows, 204, for the probe). These results suggest that the exciton energy is around 804.5 nm. Two color pulses with 0.9 nm wide spectra around $\omega_p$ and $\omega_{pr}$ were synthesized out of the Ti: sapphire laser pulses by using prisms and slits: each of spectra were adjusted to the pump (dashed curve) and probe (dotted curve) dips although the adjustment was not perfect in this case as seen in FIG. 2(*a*). A separate cross correlation experiment with a LiIO$_3$ crystal shows 1 ps temporal width of those pulses. Pump and probe beams were focused by a lens with 10 cm focal length, and the beam diameter on the sample surface was measured to be 40 $\mu$m in a separate experiment. The power and spectra of FWM signal were analyzed with a photodiode and a spectrometer in conjunction with a photomultiplier tube, respectively. Polarization of incident beams were set to be in the p-wave configurations.

With reference to FIG. 1(*a*), the pump beam $\omega_p$ and probe $\omega_{pr}$ beam produced a beam $\omega_s$, 102, emitted close to the direction of $2k_p-k_{pr}$. FIG. 2(*b*) shows the spectra of pump, 205, and probe, 206, beams which were spectrum-sliced out of 100 fs mode-locked Ti: sapphire laser pulses by using prisms and slits. The spectrum of observed non-degenerate four-wave mixing signal $\omega_s$ in the direction of $2k_p-k_p$, is also shown as the solid line, 207. The spectral peak is at 805.7 nm and frequency shift from the probe, 206, dip is 1.5 THz. Note that the spectral width 208 of the signal $\omega_s$, 207, is 0.4 nm, narrower than those of pump, 205, and probe, 206, pulses, and similar to the width (~0.5 nm) of pump dip, 201, which indicates that the signal spectrum is determined by the cavity resonance.

Figure 3A:
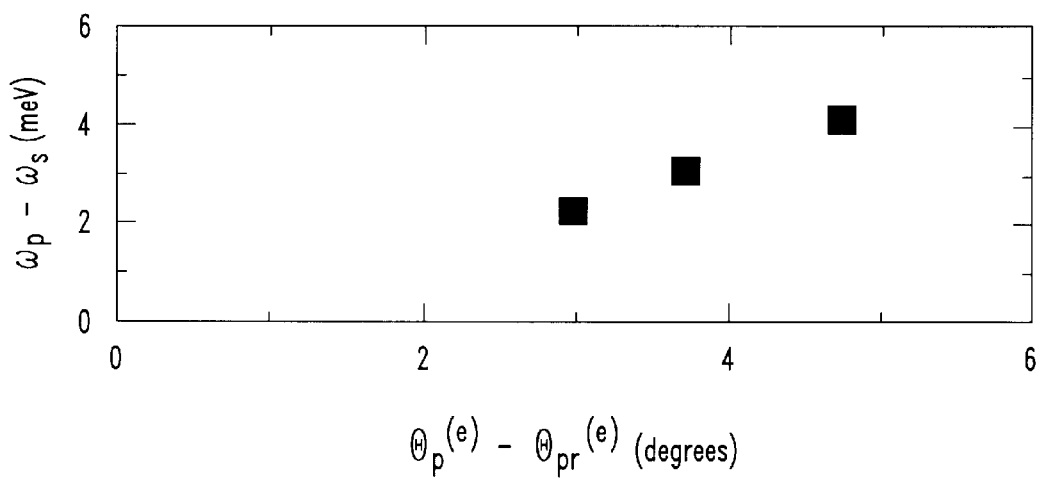
FIG. 3(a) shows the frequency shift vs. the difference between two external incidence angles.
Figure 3B:
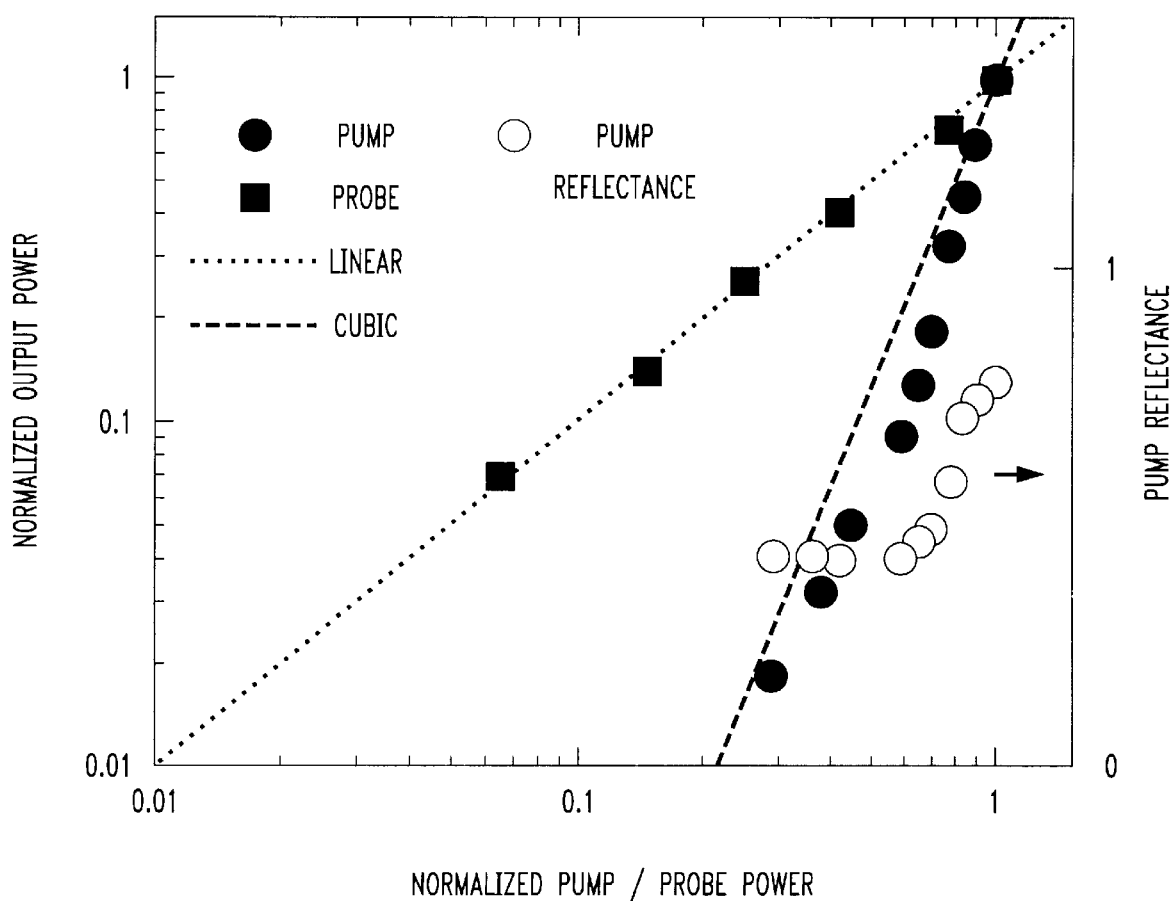
FIG. 3(b) shows the dependence of FWM-signal power on the probe beam power (●) and pump beam power (■). The ratio of incident to reflected pump beam power is also plotted (O)

FIG. 3(*a*) shows the frequency shift $\omega_p-\omega_s$ vs. the difference between two external incidence angles $\theta_p^{(e)}-\theta_{pr}^{(e)}$. The illustrative examples of FIG. 3(*a*) show that with an increase of $\Delta\theta$, $\Delta\omega$ increases monotonically as expected. For the case of $\Delta\theta$~4.7 degrees, $\Delta\omega$ as large as 4.1 meV, corresponding to 2 THz frequency conversion, was observed although signal intensity was fairly low. This is probably because $\delta$ was too large compared with $\Delta$ in this case. Anti-stokes signal was also observed in the direction of $2k_{pr}-k_p$, however, was 64 times smaller, and its spectrum was broad (~1 nm). This is, we believe, due to larger residual absorption of quantum wells at higher energy states, which is supported by the fact that the dip in probe spectra is broader than that of pump (FIG. 2 (*a*)). FIG. 2 (*c*) shows dependence of the signal intensity on probe pulse time delay. The temporal width is 2 ps which is close to the cross correlation trace measured with the LiIO$_3$ crystal.

FIG. 3(*b*) shows the dependence of FWM-signal power on the probe beam power (■) and pump beam power (●). The ratio of incident to reflected pump beam power is also plotted (O). As shown, the FWM signal intensity increases linearly with probe intensity as expected, but depends on pump intensity in a cubic manner or steeper. This implies the presence of additional nonlinearity for the pump pulses: for instance, the collapse of normal mode splitting, bleaching of excitonic state, band gap renormalization of quantum well states, and/or cavity resonance shift induced by optical index change [5], are possible mechanisms. Indeed, as shown in FIG. 3(*b*), ratio of input to reflected pump beam power changed as input pump power increased.

Maximum measured external conversion efficiency $\eta_c$ of 1.6% was achieved for 55 pJ pump pulses. Corresponding instantaneous pump power is 4.4 MW/cm$^2$. If one compares this value with the room temperature result of a 7.5 mm long passive waveguide [12], it is found that $\eta_c$ in our case is larger by 8 dB at the same pump power. Although ours is a low temperature result, it shows that the microcavity with only two quantum wells has the potential to be compared with a long passive waveguide device at least from the conversion efficiency point of view. Furthermore, since the pump and probe pulse spectra are broader than the cavity resonance widths by factors of 1.7 and 1.1, respectively, parts of pump and probe pulse energies are wasted. Therefore, if one takes those factors into account, $\eta_c$ can be calibrated to be 1.7%(=1.6%×1.1) at a reduced pump pulse energy of 33 pJ (=55 pJ/1.7). In addition, further improvement for $\eta_c$, can be expected if spectra of pump and probe beams are tuned to the resonance frequencies in more accurate manners although the sophisticated dependence of the resonance energies on the pump pulse energies is needed to be well controlled. One should note here that some part of pump pulse energy is used for bleaching of exciton absorption. Therefore, it would be interesting to supply electrons and holes in order to provide excitonic absorption bleaching or even gain. It could be possible if one pumps the sample optically by another pump pulse or electrically by injection. Note that most of our low temperature results were obtained under the high intensity pumping conditions where the excitonic absorption is mostly bleached. Therefore, there seems to be no reason which prevents this scheme from operating at higher temperature where a sharp excitonic resonance can not be expected in any cases, but the cavity enhancement of optical intensity is still effective.

Thus in accordance with our present invention, we have developed a new ND-FWM device configuration where pump and probe beam are obliquely incident on a semiconductor microcavity which generates a highly non-degenerate four-wave mixed output signal. Indeed, our configuration generates fairly high external efficiency (1.6%) at 10 K for 1.5 THz frequency conversion using relatively low pump pulse energy of 55 pJ.

FIG. 5, in accordance with our invention, illustrates our proposal to generate widely separated frequency (wavelength) sidebands efficiently using FWM in semiconductor microcavity operated in a transmission mode. Such an arrangement can, for example, be used for wavelength add-drop multiplexing (WADM). The basic idea is to use the two incident beams ($\omega_1$, $k_1$ and $\omega_p$, $k_P$) at different oblique angles of incidence $\theta_1$ and $\theta_p$ respectively. FWM generates a diffracted signal, 507, at $\omega_3$, $k_3$, $\theta_3$ determined by energy and momentum conservation. In FIG. 5, FWM produces the signal $\omega_3$, $k_3$, $\theta_3$, 507, shown graphically as $2k_P-k_1$. The incident angles $\theta_1$ and $\theta_P$ are chosen such that (i) each beam matches the cavity resonance frequency at its angle, and (ii) the mismatch between the frequency of the diffracted beam with the cavity resonance frequency along the diffracted direction is minimized; i.e. the resonant frequency of the microcavity along $k_3$ is close to $\omega_3$. This improved phase-matching technique optimizes the efficiency of the nonlinear process for large wavelength (frequency) shifts. The maximum wavelength shift is determined by the cavity parameters and how the reflectivity changes with angle. Stokes as well as anti-Stokes sidebands up to a few THz spacing can be generated by this technique. Sideband spacing as large as 1.5 THz with an efficiency of 1% at low temperatures have been obtained. Efficiencies can be further optimized and room temperature operation in the 850 nm and 1550 nm region should be possible. An additional advantage of this system is that the generated beam is in a direction that has no background signal. This background-free generation of sidebands is a very useful feature not found in other systems.

In accordance with the present invention, the illustrative arrangement of FIG. 5 can be utilized as a Wavelength Add-Drop Multiplexer (WADM). In a wavelength add arrangement (i.e., a wavelength multiplexer), a first wavelength signal $\omega_1$ having a wave vector $k_1$ is received over fiber 501 and focused by lens 502 onto the surface of semiconductor microcavity 503. A second wavelength signal $\omega_2$ having a wave vector $k_2$ is received over fiber 504 and focused by lens 505 onto the surface of semiconductor microcavity 503. The wavelengths $\omega_1$ and $\omega_2$ impinge the surface of semiconductor microcavity 503 at an angle $\theta_1$ and $\theta_2$, respectively, to the surface normal angle forming oblique angles to the surface of microcavity 503). A pump signal $\omega_p$, 506, having a wave vector $k_p$ is received, e.g., from a laser source, and impinges semiconductor microcavity 503 at an angle $\theta_p$ to the surface normal angle $\theta_N=90°$.

As previously discussed above, the signal $\omega_3$, $k_3$, $\theta_3$ (shown as 507) is the result of four-wave mixing (FWM) of the probe wavelength $\omega_1$ with the pump signal $\omega_p$, 506. The resulting FWM signal 507 is shown graphically as $2k_p-k_1$. The signal $\omega_4$, $k_4$, $\theta_4$ (shown as 508) is the result of four-wave mixing (FWM) of the probe wavelength $\omega_2$ with the pump signal $\omega_p$, 506. The resulting FWM signal 508 is shown graphically as $2k_p-k_2$. The wave vector $k_2$ is selected (i.e., the incident angle for wavelength $\omega_2$ is selected) so that the angle $\theta_4$ of resulting signal $\omega_4$ is the same as wavelength $\omega_3$. Thus, the resulting wave vectors $k_3$ and $k_4$ (i.e., 507 and 508) for wavelengths ($\omega_3$ and $\omega_4$, respectively, have the same direction but have different energy or intensity values. As a result of the FWM operation, the wavelengths $\omega_1$ and $\omega_2$ have been waveshifted to $\omega_3$ and $\omega_4$, respectively, and multiplexed together. The multiplexed signal is received at lens 509 and focused onto fiber 510. If desirable, the original wavelengths may be restored at a receiver end by reversing the above FWM process.

FIG. 6 shows, in accordance with the present invention, an illustrative wavelength division demultiplexer using an active microcavity in a transmission mode. An illustrative wavelength multiplexed signal $\omega_1-\omega_N$ is received over an optical fiber 601 and focused by lens 602 onto the microcavity 603. In our example, the wavelength $\omega_1 > \omega_2 > \ldots > \omega_N$ and $\omega_P > \omega_1$. The wavelengths $\omega_1-\omega_N$, having wave vector values $k_1-k_N$, impinge the surface of semiconductor microcavity 603 at an angle $\theta_{PR}$, respectively, to the surface normal angle. A pump signal $\omega_p$, 506, having a wave vector $k_p$ is received, e.g., from a laser source, and impinges semiconductor microcavity 503 at an angle $\theta_p$ to the surface normal angle $\theta_N$. The result of four-wave mixing (FWM) of the pump wavelength $\omega_P$ with the wavelengths $\omega_1-\omega_N$ is shown graphically as a series of signal 604–605 in FIG. 6. Each of these FWM signals, for example the FWM signal $\omega_1'$, 604, (formed from $\omega_1$) and the FWM signal $\omega_N'$, 605, (formed from $\omega_N$) is shown graphically as $2k_p-k_1$, and $2k_p-k_N$, respectively. The signals 604–605 are then focused via a lens 606–608, respectively, into the optical fibers 607–609, respectively. It should be noted that the pump signal can be a pulsed signal having an on-state and an off-state and, consequently, the output signal is generated only when the pulsed signal is in an on-state.

In FIG. 6, as a result of the FWM operation, the wavelengths $\omega_1$ through $\omega_N$ have been waveshifted to $\omega_1'$ through $\omega_N'$, respectively, and demultiplexed into separate signals $\omega_1$ through $\omega_N$ traveling along different directions. Again, if desirable, the original wavelengths $\omega_1$ and $\omega_N$ may be restored at a receiver end by reversing the above FWM process In accordance with another aspect of the invention, a wavelength drop circuit which does not change the wavelength of the dropped signal can also be implemented. Such a wavelength drop circuit would be use a degenerate four-wave mixing (ND-FWM) apparatus where the optical pump signal $\omega_p$ has the same wavelength as the probe signal $\omega_{PR}$. Making the incident angle to the microcavity slightly different for $\omega_p$ and $\omega_{pr}$ would reduce loss of signal. The resulting output signal would then have a wavelength of $2\omega_P-\omega_{PR}$ which is equal to $\omega_{PR}$, since $\omega_P=\omega_{PR}$.

Figure 8:
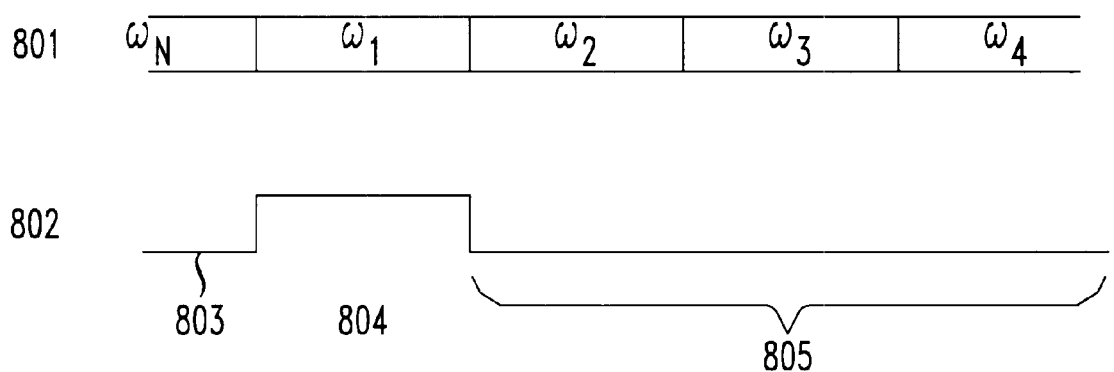
FIG. 8 shows an illustrative TDM signal and pump signals for the circuit of FIG. 7.

FIG. 7 shows, in accordance with the present invention, an illustrative time-division multiplexed (TDM) wavelength division multiplexer using an active microcavity in a transmission mode. The multiplexed received wavelengths $\omega_1-\omega_N$ and the resulting FWM wavelengths $\omega_1'-\omega_N'$ are identical to those shown in FIG. 6 when a pump beam $\omega_p$ is present. A time-division multiplexed (TDM) wavelength division multiplexer operation results when the pump beam $\omega_p$ is a pulsed time-division multiplexed signal, as shown in FIG. 8. With joint reference to FIGS. 7 and 8, the TDM wavelength division multiplexer operation is described. The signal 801 represents the TDM signal received over fiber 601 and the signal 802 represents a TDM pump signal $\omega_p$. As shown, the pump signal $\omega_p$ is pulsed or switched-on only during the time slot 804 when wavelength $\omega_1$ is present. As a result, as previously described, FWM occurs between wavelength $\omega_1$ and pump signal $\omega_p$ produces the wavelength $\omega_1'$, which is demultiplexed from the multiplexed wavelengths $\omega_N$ and is outputted via lens 606 to fiber 607. However, during time slots 803 and 805, the pump signal $\omega_p$ is not present when wavelength $\omega_N$ and wavelengths $\omega_2$ through $\omega_4$ are present. As a result, no FWM occurs during the time slots 803 and 805 and, consequently, the wavelengths $\omega_N$, $\omega_2$ through $\omega_4$ are not demultiplexed, but rather are directed 701 via lens 702 to optical fiber 703. The signal 701 represents the typical refraction of the wavelengths $\omega_N$, $\omega_2$ through $\omega_4$ through the microcavity 603.

It should be noted that while the arrangement of FIG. 7 used a multiple wavelength $\omega_1, \omega_2, \ldots \omega_N$)time-multiplexed signal, a single wavelength time-multiplexed signal could also have been utilized (e.g., only wavelength $\omega_1$ in all the time slots of 801). Additionally the signal time intervals shown in 801 could represent either a time slot signal or a packet signal. The arrangement of FIG. 7 can be used as the drop section of an add/drop circuit, wherein the wavelength desired to be dropped is dropped during the existance of the pump signal $\omega_p$.

A wavelength conversion circuit can also be implemented using our non-degenerate four-wave mixing (ND-FWM)

arrangement. In such an embodiment, the optical pump signal would use a frequency $\omega_p = \frac{1}{2}(\omega_D + \omega_I)$, where $\omega_D$ is the desired output frequency and where $\omega_I$ is the frequency of the input signal. As we have noted the output signal generated in the microcavity from the pump and input signals, the output signal would then have a frequency of $2\omega_P - \omega_{PR}$ which when we substitute $\omega_p = \frac{1}{2}(\omega_D + \omega_I)$ becomes the desired frequency ($\omega_D$).

An optical signal switch can also be implemented using our non-degenerate four-wave mixing (ND-FWM) arrangement of FIG. 7. Such an embodiment would use a switched optical control signal having an on-state and an off-state and a wavelength $\omega_P$. The input signal would have a wavelength $\omega_{PR}$. A first output signal, generated in the microcavity from the input signal and the control signal, during an on-state of the control signal, would then have a wavelength of $2\omega_P - \omega_{PR}$. A second output signal, generated in said microcavity from the input signal and the control signal, during an off-state of the control signal, would then have a wavelength of $\omega_{PR}$. The wavelength of the control signal $\omega_P$ can also be made equal to that of the input signal $\omega_{PR}$ that no wavelength shifting occurs during switching. The control signal $\omega_P$ can also be a time division signal which can then select one or more time slots of the input signal.

Thus, what has been described is merely illustrative of the application of the principles of the present invention. Other arrangements and methods can be implemented by those skilled in the art without departing from the spirit and scope of the present invention.

APPENDIX
REFERENCES:

[1] H. Wang, J. Shah, T. C. Damen, W. Y. Jan, J. E. Cunningham, M. Hong, and J. P. Mannaerts, Phys. Rev. B 51, 14713 (1995).
[2] A. Kestler, Appl. Opt. 1, 17 (1962).
[3] R. Buheier, V. Bardinal, J. H. Collet, C. Fontaine, M. Hubner and J. Kuhl, Appl. Phys. Lett. 69, 2240 (1996).
[4] J. H. Collet, R. Buheier and J. O. White, J. Opt. Soc. Am. B 12, 2439 (1995).
[5] For example, Y. Matsunaga, M. Tsuchiya and T. Kamiya, Electronics Lett. 30, 1780 (1994); M. Tsuchiya, M. Koch, J. Shah, T. C. Damen, W. Y. Jan, and J. E. Cunningham, to be published, Appl. Phys. Lett., 71, 1240 (1997)
[6] K. C. Lee and V. O. K. Li, J. Lightwave Technol. LT-11, 962 (1993).
[7] A. Yariv, D. Fekete and D. M. Pepper, Opt. Lett. 4, 52 (1979).
[8] G. P. Agrawal, J. Opt. Soc. Am. B5, 147 (1988).
[9] F. Tiemeijer, Appl. Phys. Lett. 59, 499 (1991).
[10] K. Kikuchi, M. Kakui, C. E. Zah and T. P. Lee, IEEE J. Quantum Electron. QE-28, 151 (1992),
[11] J. Zhou, N. K. Park, K. J. Vahala, M. A. Newkrk and B. I. Miller, Photon. Technol. Lett. 6, 984 (1994).
[12] A. M. Darwich, E. P. Ippen, H. Q. Le, J. P. Donnelly, S. H. Groves, and E. A. Swanson, Appl. Phys. Lett. 68, 2038 (1996); A. M. Darwich, E. P. Ippen, H. Q. Le, J. P. Donnelly and S. H. Groves, Appl. Phys. Lett. 69, 737 (1996).
[13] S. Jiang, M. Dagenais and R. A. Morgan, Appl. Phys. Lett. 65, 1334 (1994).
[14] A. Honold, L. Schultheis, J. Kuhl, and C. W. Tu, Appl. Phys. Lett. 52, 2105 (1988).
[15] G. Björk and Y. Yamamoto, Section 6 in *Spontaneous Emission and Laser Oscillation in Microcavities*, edited by H. Yokoyama and K. Ujihara, (CRC Press, Boca Raton, 1995); pp. 189–235.
[16] D. I. Bobic and S. W. Corzine, IEEE, J. Quantum Electron. QE-28, 514 (1992).
[17] C. Weisbuch, M. Nishioka, A. Ishikawa, and Y. Arakawa, Phys. Rev. Lett. 69, 3314 (1992).
[18] K. J. Vahala, J. Zhou, D. Geraghty, R. Lee, M. Newkirki, B. Miller, "Four-wave mixing in semiconductor traveling-wave amplifiers for wavelength conversion in all-optical networks", *Int. J. High Speed Electron. & Sys.* 7, 153 (1996).

What is claimed is:

1. A non-degenerate four-wave mixing (ND-FWM) apparatus comprising a microcavity including one or more semiconductor quantum wells;

an optical signal source for providing an optical pump signal, having a wavelength $\omega_p$ and a wave vector $k_p$, injected at a first predetermined oblique angle into the microcavity;

an optical probe signal, having a wavelength $\omega_{PR}$ and a predefined wave vector $k_{PR}$, injected at a second predetermined oblique angle into the microcavity; and an output signal generated in said microcavity from said pump and said probe, said output signal exiting the microcavity at an oblique angle and having a wavelength of $2\omega_P - \omega_{PR}$ and a wave vector equal to $2k_P - k_{PR}$.

2. The ND-FWM apparatus of claim 1 wherein the relationship between first $\theta_P^{(i)}$ and second $\theta_{PR}^{(i)}$ oblique angles and the wavelengths of the pump $\omega_P$ and probe signals $\omega_{PR}$, respectively, is given by $$\omega_{res} = \frac{\omega_0}{\cos\theta^{(i)}} = \omega_0 \sqrt{1 + \left|\frac{k_\parallel}{k_\perp}\right|^2}$$

where $\omega_0$ is the resonance frequency for the normal incidence, $k_\parallel$ and $k_\perp$ are internal wave vector components normal and parallel to the microcavity surface, respectively.

3. The ND-FWM apparatus of claim 1 arranged as part of a wavelength multiplexer comprising a second optical probe signal, having a wavelength $\omega_{PR2}$ and a predefined wave vector $k_{PR2}$, injected into the microcavity at a third predetermined oblique angle which is different from the first and second predetermined angles; and a combined output signal generated in said microcavity from said pump signal, said probe signal, and said second probe signal, said combined output signal exiting the microcavity at an oblique angle and including said output signal as a component having a wavelength of $2\omega_P - \omega_{PR}$ and a wave vector equal to $2k_P - k_{PR}$ and a second output signal component having a wavelength of $2\omega_P - \omega_{PR2}$ and a wave vector equal to $2k_P - k_{PR2}$, with $2k_P - k_{PR} = 2k_{P-kPR2}$.

4. The wavelength multiplexer of claim 3 wherein the microcavity includes a quantum well unit placed between a pair of Bragg gratings.

5. The wavelength multiplexer of claim 4 wherein the quantum well unit includes at least one GaAs quantum well.

6. The wavelength multiplexer of claim 4 wherein each of the Bragg gratings includes different number of pairs of $Al_{1.1}Ga_{0.89}As/AlAs$ quarter wave stacks.

7. The wavelength multiplexer of claim 3 wherein said pump signal is an on/off pulsed signal and wherein said combined output signal is generated when said on/off pulsed signal is on.

8. The ND-FWM apparatus of claim 1 arranged as part of a packet multiplexer comprising wherein said pump signal is a pulsed optical pump signal;

wherein said probe signal is a first packetized optical probe signal;

a second packetized optical probe signal, having a wavelength $\omega_{PR2}$ and a predefined wave vector $k_{PR2}$, injected into the microcavity at a third predetermined oblique angle which is different from the first and second predetermined angles; and a combined output signal generated in said microcavity from said pulsed pump signal, said first packetized probe signal, and said second packetized probe signal, said combined output signal exiting the microcavity at an oblique angle and including said output signal as a first output signal packet component selected by a first pulse from said pulsed pump signal and having a wavelength of $2\omega_P - \omega_{PR}$ and a wave vector equal to $2k_p - k_{PR}$ and a second output signal packet component selected by a second pulse from said pulsed pump and having a wavelength of $2\omega_P - \omega_{PR2}$ and a wave vector equal to $2k_P - k_{PR2}$, with $2k_P - k_{PR} = 2k_P - k_{PR2}$.

9. The ND-FWM apparatus of claim 1 arranged as part of a wavelength demultiplexer wherein said probe signal is part of a multiple-wavelength optical probe signal injected at a second predetermined oblique angle into the microcavity, said multiple-wavelength probe signal including the wavelength $\omega_{PR}$ having a wave vector equal to $k_{PR}$ and a second wavelength $\omega_{PR2}$ having a wave vector equal to $k_{PR2}$;

wherein said output signal generated in said microcavity from said pump and said first wavelength signal, said output signal exiting the microcavity at a third oblique angle and having a wavelength of $2\omega_P - \omega_{PR}$ and a wave vector equal to $2k_P - k_{PR}$; and a second output signal generated in said microcavity from said pump and said second wavelength signal, said second output signal exiting the microcavity at a fourth oblique angle which is different from the third oblique angle and having a wavelength of $2\omega_P - \omega_{PR2}$ and a wave vector equal to $2k_P - k_{PR2}$.

10. The ND-FWM apparatus of claim 1 arranged as part of a packet demultiplexer wherein said pump signal is a pulsed optical pump signal;

wherein said probe signal is a multiple-packet optical probe signal injected at a second predetermined oblique angle into the microcavity, said multiple-packet probe signal having a first wavelength $\omega_{PR1}$ and a wave vector equal to $k_{PR1}$; and wherein said output signal is a pulsed output signal generated in said microcavity from said pulsed pump and said multiple-packet probe signal, said pulsed pump signal being controlled to select one or more packets from the multiple-packet probe signal, said pulsed output signal exiting the microcavity at a third oblique angle and having a wavelength of $2\omega_P - \omega_{PR1}$ and a wave vector equal to $2k_P - k_{PR1}$.

11. The packet demultiplexer of claim 10 wherein said multiple-packet probe signal is a time division signal and said pulsed pump signal is controlled to select one or more time slots of the time division signal.

12. The packet demultiplexer of claim 10 wherein said multiple-packet optical probe signal includes a packet having second wavelength $\omega_{PR2}$ having a wave vector equal to $k_{PR2}$, wherein said pulsed pump selects said second wavelength packet from the multiple-packet probe signal and wherein said pulsed output signal includes a second wavelength packet derived output packet which has a wavelength of $2\omega_P - \omega_{PR2}$ and a wave vector equal to $2k_p - k_{PR2}$, with $2k_p - k_{PR} = 2k_p - k_{PR2}$.

13. The ND-FWM apparatus of claim 1 arranged as part of an optical wavelength signal switch wherein said pump signal is a switched optical control signal having an on-state and an off-state, a wavelength $\omega_P$, of and a wave vector $k_P$, said control signal being injected at a first predetermined oblique angle into the microcavity;

wherein said probe signal is an input signal; and wherein said output signal is generated in said microcavity from said input signal and said control signal, during an on-state of said control signal, said output signal having a wavelength of $2\omega_P - \omega_{PR}$ and a wave vector equal to $2k_P - k_{PR}$; and wherein a second output signal is generated in said microcavity from said input signal and said control signal, during an off-state of said control signal, said first output signal having a wavelength of $\omega_{PR}$.

14. The optical wavelength signal switch of claim 13 wherein the wavelength $\omega_{PR}$ is equal to $\omega_P$.

15. The optical wavelength signal switch of claim 13 wherein said control signal is a time division signal which selects one or more time slots of said input signal.

16. A method of generating a non-degenerate four-wave mixing (ND-FWM) signal comprising the steps of:

receiving an optical pump signal, having a wavelength $\omega_p$ and a wave vector $k_P$, injected at a first predetermined oblique angle into a microcavity having one or more semiconductor quantum wells;

receiving an optical probe signal, having a wavelength $\omega_{PR}$ and a predefined wave vector $k_{PR}$, injected at a second predetermined oblique angle into said microcavity; and generating a output signal in said microcavity from said pump and said first probe, said output signal exiting the microcavity at an oblique angle and having a wavelength of $2\omega_P - \omega_{PR}$ and a wave vector equal to $2k_P - k_{PR}$.

17. The method of claim 16 where the wavelength $\omega_P$ of the pump signal is greater than the wavelength $\omega_{PR}$ of the probe signal.

18. A degenerate four-wave mixing (ND-FWM) apparatus comprising a microcavity including one or more semiconductor quantum wells;

an optical signal source for providing an optical pump signal, having a wavelength $\omega_{PR}$ and a wave vector $k_P$, injected at a first predetermined oblique angle into the microcavity;

an optical probe signal, having said wavelength $\omega_{PR}$ and a predefined wave vector $k_{PR}$, injected at a second predetermined oblique angle into the microcavity; and an output signal generated in said microcavity from said pump and said probe, said output signal exiting the microcavity at an oblique angle and having a wavelength of $\omega_{PR}$ and a wave vector equal to $2k_P - k_{PR}$.

19. A non-degenerate four-wave mixing (ND-FWM) wavelength conversion apparatus comprising a microcavity including one or more semiconductor quantum wells;

an optical signal source for providing an optical pump signal, having a wavelength $\omega_P$ and a wave vector $k_P$, injected at a first predetermined oblique angle into the microcavity, where the wavelength $\omega_P = \frac{1}{2}(\omega_D + \omega_I)$ where $\omega_D$ is the desired wavelength and where $\omega_I$ is the wavelength of the input signal said input signal, having a wavelength $\omega_I$ and a predefined wave vector $k_{PR}$, injected at a second predetermined oblique angle into the microcavity; and said desired wavelength $\omega_D$ signal generated in said microcavity from said pump and said input signals, said desired wavelength signal exiting the microcavity at an oblique angle and having a wavelength of $\omega_D$ and a wave vector equal to $2k_P - k_{PR}$.

* * * * *